United States Patent [19]

Suzuki et al.

[11] Patent Number: 5,055,941
[45] Date of Patent: Oct. 8, 1991

[54] PHOTOGRAPHIC PRINTER WITH MONITOR

[75] Inventors: Kenji Suzuki, Kanagawa; Fumio Matsumoto, Tokyo, both of Japan

[73] Assignee: Fuji Photo Film Co., Ltd., Kanagawa, Japan

[21] Appl. No.: 324,060

[22] Filed: Mar. 16, 1989

[30] Foreign Application Priority Data

Mar. 16, 1988 [JP] Japan .................................. 63-62852

[51] Int. Cl.⁵ ............................................. G03B 27/52
[52] U.S. Cl. ..................................... 358/450; 358/76; 358/80; 358/72
[58] Field of Search ....................... 358/75, 76, 77, 80, 358/400, 401, 298, 448, 450, 452, 453, 471, 487, 490, 491; 355/72, 32, 44, 75, 40, 39; 352/90

[56] References Cited

U.S. PATENT DOCUMENTS

| | | | |
|---|---|---|---|
| 3,853,399 | 12/1974 | Walsh | 355/40 |
| 3,984,849 | 10/1976 | Guillaume | 355/32 |
| 4,422,752 | 12/1983 | Thurm et al. | 355/32 |
| 4,459,015 | 7/1984 | Brecht | 354/109 |
| 4,656,524 | 4/1987 | Norris et al. | 358/76 |
| 4,745,465 | 5/1988 | Kwon | 358/80 |
| 4,746,207 | 5/1988 | Selin | 352/80 |
| 4,769,678 | 9/1988 | Komoda et al. | 352/90 |
| 4,782,390 | 11/1988 | Hayashi et al. | 358/78 |
| 4,786,944 | 11/1988 | Sakamoto et al. | 355/20 |
| 4,854,696 | 8/1989 | Guez | 355/40 |
| 4,876,567 | 10/1989 | Yamaguchi et al. | 355/39 |
| 4,896,186 | 1/1990 | Tokuda | 355/40 |

FOREIGN PATENT DOCUMENTS 0122025  9/1981  Japan .................................. 358/76

Primary Examiner—Edward L. Coles, Sr.
Assistant Examiner—Jerome Grant, II
Attorney, Agent, or Firm—Sughrue, Mion, Zinn Macpeak & Seas

[57] ABSTRACT

A photographic printer with a monitor having a printing stage defined between a printing optical system including a light source and a printing lens in a printing optical path, comprises a holder slidable in the printing stage for separately holding a film and a complimentary phrase bearing sheet and selectively placing the film or the sheet in the printing optical path, an imaging device for providing image data of the film or the complimentary phrase bearing sheet placed in the printing optical path, and a composing circuit for composing the image data to provide composed image data. The monitor displays the composed image data as a composite image for visual inspection.

8 Claims, 4 Drawing Sheets

PHOTOGRAPHIC PRINTER WITH MONITOR

BACKGROUND OF THE INVENTION

The present invention relates to a photographic printer equipped with a monitor for displaying a simulated image with letters.

In recent years, there has been widespread use of various kinds of photographic prints of a human figure or figures with a date, place and/or a short or of a scene with a season's greeting or complimentary phrase, or an illustration which are often used as postcards, greeting cards and the like. The prints are made by exposing a photographic paper to a photographic film masked with a scene masking frame and then to a complimentary phrase bearing sheet masked with a complimentary phrase masking frame.

In such printers, it is difficult to observe or inspect a composite image constructed from a principal image with an inlaid complimentary phrase in advance of printing.

OBJECT OF THE INVENTION

It is therefore an object of the present invention to provide a photographic printer in which the location of a complimentary phrase of a composite image can be inspected on a monitor.

SUMMARY OF THE INVENTION

The above and other objects of the present invention can be achieved by providing a photographic printer in which a printing stage is defined between a light source and a printing lens in a printing optical path, the photographic printer comprising: a holder slidable in the printing stage for separately holding a film and a complimentary phrase bearing sheet bearing a complimentary phrase and for selectively placing the film or the complimentary phrase bearing sheet in the printing optical path; an imaging device in the printing optical path for providing image data of the film or the complimentary phrase bearing sheet; and a composing circuit for composing the image data of the film and the complimentary phrase bearing sheet to provide composed image data. The composed image data is displayed on a monitor as a composite image constructed from an image of the film and an inlaid image of the complimentary phrase.

According to a preferred embodiment of the present invention, the image composing circuit includes at least one memory for storing the image data of either one of the film or the complimentary phrase bearing sheet. The image data read out from the memory is added together to the image data of the other of the film and the complimentary sheet which is positioned in the printing optical path to provide composed image data. By visually observing a composite image displayed on the monitor screen, the complimentary phrase image can be inspected to determine whether the complimentary phrase is correct and located at a desired position.

BRIEF DESCRIPTION OF THE DRAWINGS

These and other objects and features of the invention will be apparent to those skilled in the art from the following description taken in conjunction with the accompanying drawings in which.

DETAILED DESCRIPTION OF THE INVENTION

Figure 1:
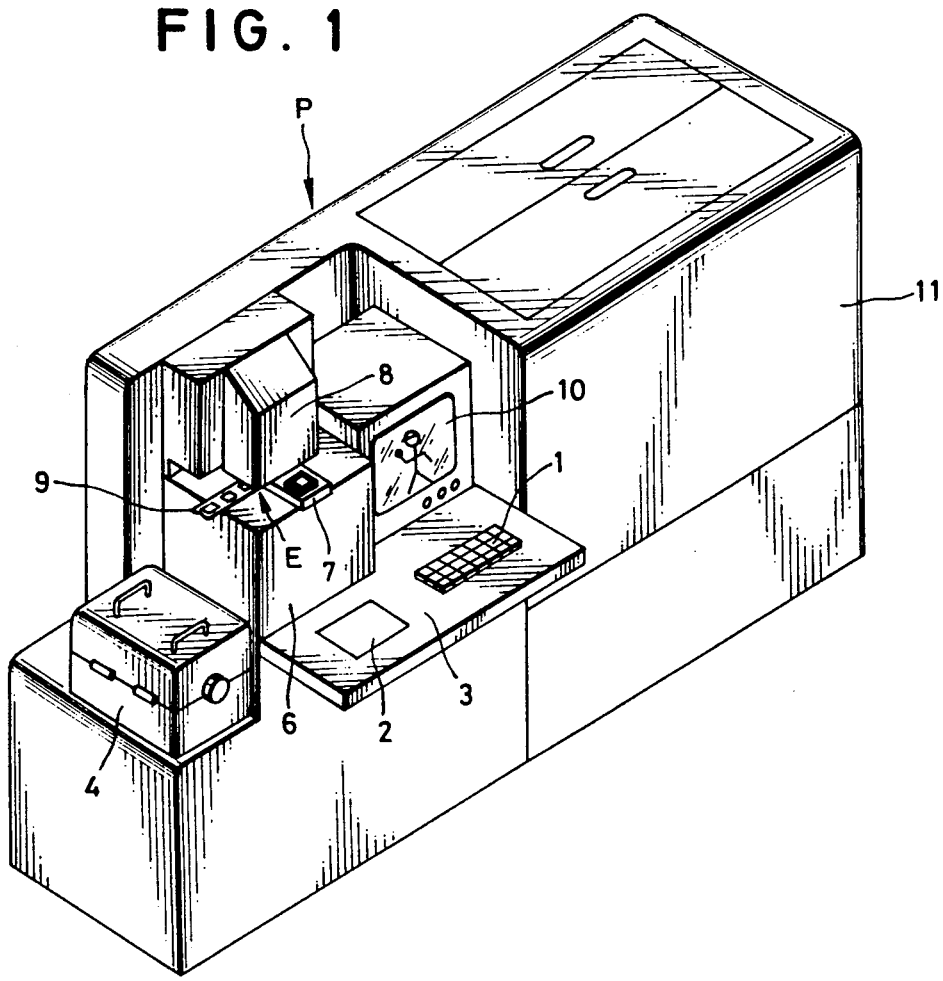
FIG. 1 is a perspective view of the photographic printer-processor with a monitor according to a preferred embodiment of the present invention.
Figure 2:
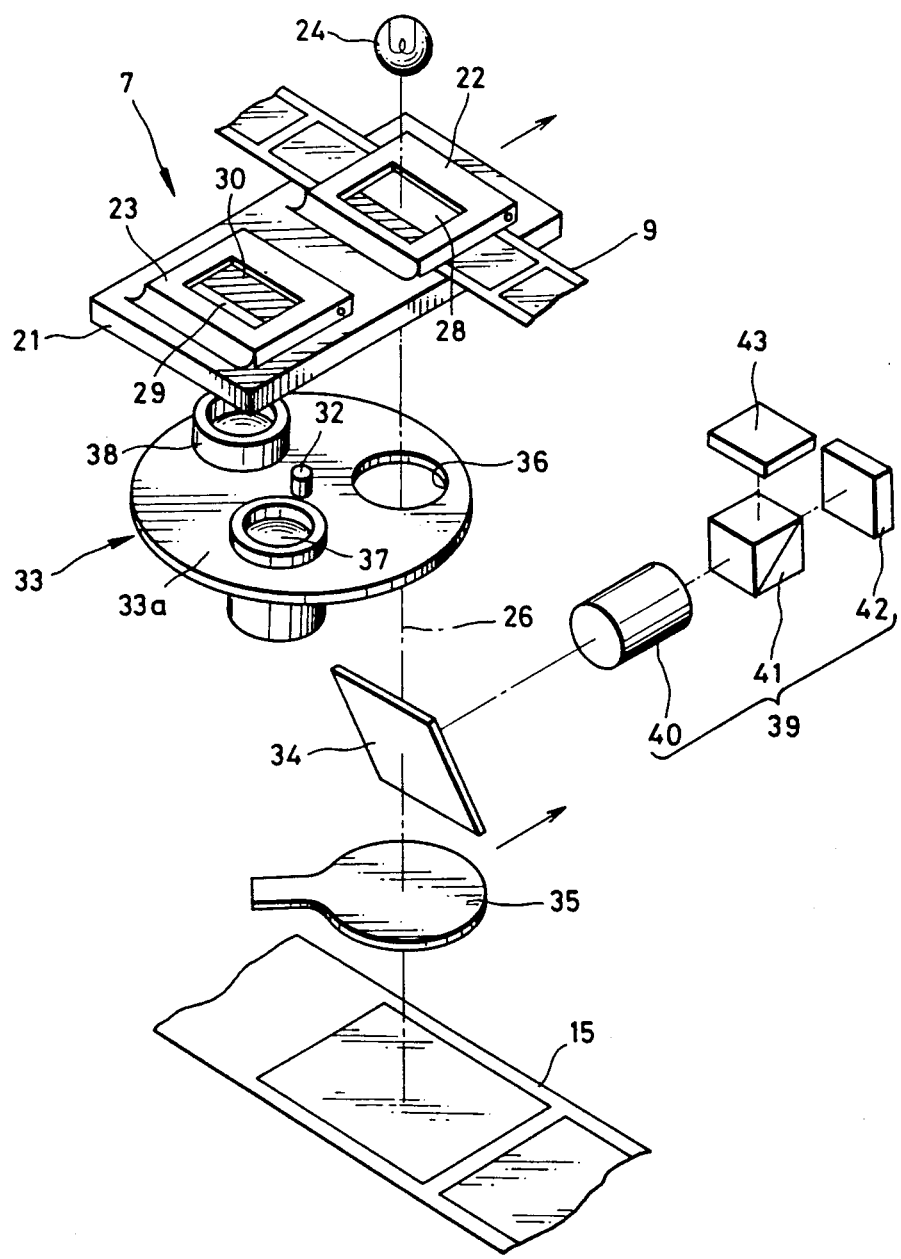
FIG. 2 is an exploded perspective view showing a printer system of the printer-processor shown in FIG. 1.

Referring now to FIGS. 1 and 2, an erecting type photographic printer-processor P having printing and processing functions in which the present invention is applied is shown. The printer-processor P is provided with a working table 3 having a keyboard 1 and a see-through table 2. An operator stands, or sits on a chair, in front of the working table 3 to operate the printer-processor P.

A light-proof magazine 4, which contains therein a roll of photographic paper 15, is disposed at the left-hand side of the printer-processor P. The magazine 4 is openable for loading another roll of photographic paper. The photographic paper 15 is withdrawn from the magazine 4 by a certain length substantially equal to that of one frame of a print into a printer 6 for exposure. A lamp house 8 in which a lamp 24 as a light source is included is mounted right above the printer 6 with a space therebetween forming a printing stage E of the printer 6. A holder assembly 7 is slidably inserted into or displaced from the printing stage E. The holder assembly 7 holds a photographic film such as a negative film 9, with a series of frames of negative images and a complimentary bearing sheet 29 which will be described later.

Printing light emanating from the lamp 24 in the lamp house 8 projects an image of a frame of the negative film 9 onto the photographic paper 15. The image is picked up by a monitor optical system 39 and displayed on a screen of a monitor, such as a color CRT 10, for monitoring. The monitor optical system 39 can take any form well known in the art. A photographic processor 11 is installed as an integral unit for photographically processing the exposed photographic paper 15. Because the structure and operation of the processor 11 of the printer-processor P are well known to those skilled in the art and the present invention is strictly associated with the printer 6, details of the processor 11 need not be illustrated and explained herein. Therefore, the following description is directed only to the printer 6.

Figure 4:
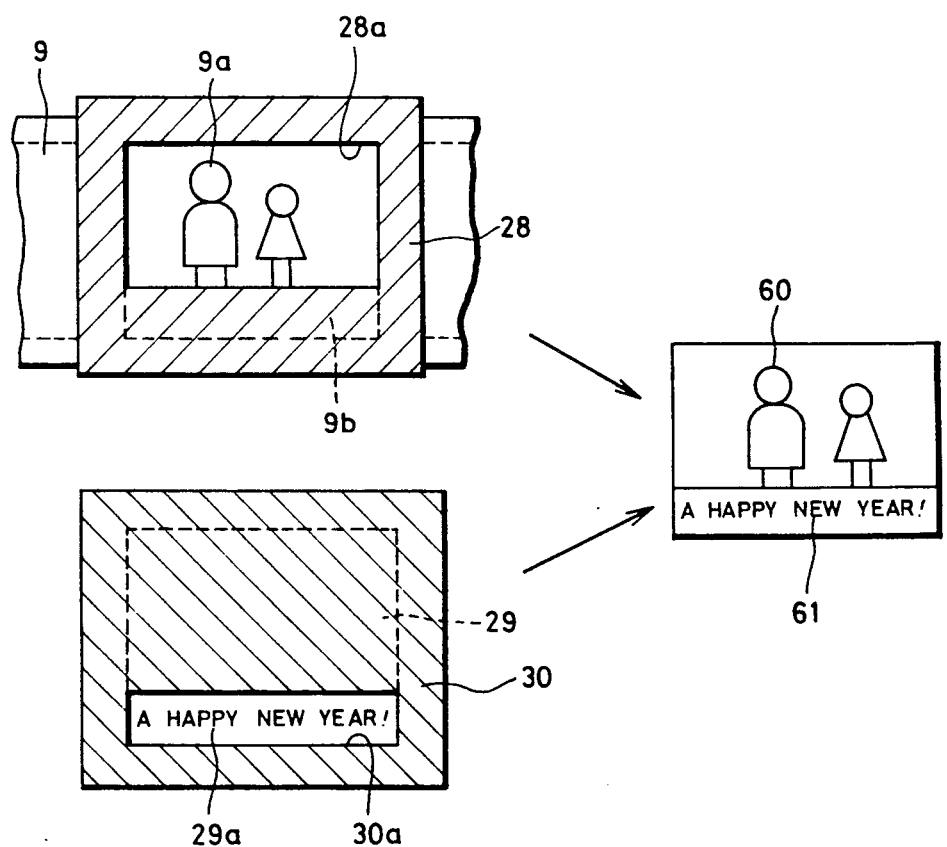
FIG. 4 is an explanatory illustration showing composing a film image and an image of a complimentary phrase.

As shown in FIG. 2 illustrating details of the printer 6, the holder assembly 7 comprises a holder base 21, a film holder 22 pivotally mounted on the holder base 21 for pivotable up and down movement and a complimentary bearing sheet holder 23 laterally displaced apart from the film holder 22 and pivotally mounted on the holder base 21 for pivotable up and down movement. The holder base 21 is movable in a plane perpendicular to a vertical printing light path 26 defined between the lamp 24 and the photographic paper 15 and into the printing stage E to position either one of the holders 22 and 23. The film holder 22 holds the negative film 9 masked with a masking frame 28 overlapped thereon and maintains them flat as shown in FIG. 4. Similarly, the complimentary bearing sheet holder 23 holds the complimentary bearing sheet 29 masked with a complimentary bearing sheet masking frame 30, and maintains them flat.

A printing lens setup 33 is disposed below the printing stage E in the printing light path 26 and has a mount disk 33a mounting two printing lenses 37 and 38 having different focal lengths and formed with a circular opening 36. The mount disk 33a can rotate about a shaft 32. A slidable mirror 34 is disposed below the printing lens setup in the printing light path 26 at a certain angle, for example 45 degrees, with respect to the printing light path 26. The slidable mirror 34 is displaceable from the printing light path 26. A shutter 35 is disposed between the slidable mirror 34 and the negative film 9 in the printing light path 26 and is movable into, and displaceable from, the printing light path 26.

A monitor optical system 39 is provided facing to the slidable mirror 34 and the optical axis of the monitor optical system 39 is at a right angle with respect to the printing light path 26. The monitoring optical system 39 comprises a zoom lens 40 directly facing to the slidable mirror 34, a beam splitter 41 positioned behind the zoom lens 40 for dividing light passed through the zoom lens 40 into two parts, an image sensor 42 disposed behind the beam splitter 41, and a light metering or photometric device 43 comprising a photoelectric device disposed overhead or right above the beam splitter 41. The image sensing device 42, which is a charge coupled device (CCD), converts one part of the light divided by the beam splitter 41 and forms an image thereon into video signals.

When monitoring an image of a frame of the negative film 9 placed at the printing stage E in advance of printing the image, the printing lens setup 33 is turned about the shaft 32 to place the circular opening 36 into the printing light path 26 and the slidable mirror 34 is positioned at 45 degrees in the printing light path 26. The image is projected and focused on the CCD image sensor 42 by the zoom lens 40 to be converted into video signals which are displayed on the screen of the color CRT 10 by way of a monitor circuit which will be described in detail later.

On the other hand, in order to make the printer 6 ready for printing the image on the photographic paper 15 the printing lens setup 33 is turned about the shaft 32 to place a desired one of the printing lenses 37 and 38 in the printing light path 26 and the slidable mirror 34 is displaced from the printing light path 26. While the shutter 35 opens, the image of the frame of the negative film 9 or the image of the complimentary bearing sheet 29 is projected and focused on the photographic paper 15 by the printing lens 37 or 38, and thus printed.

Figure 3:
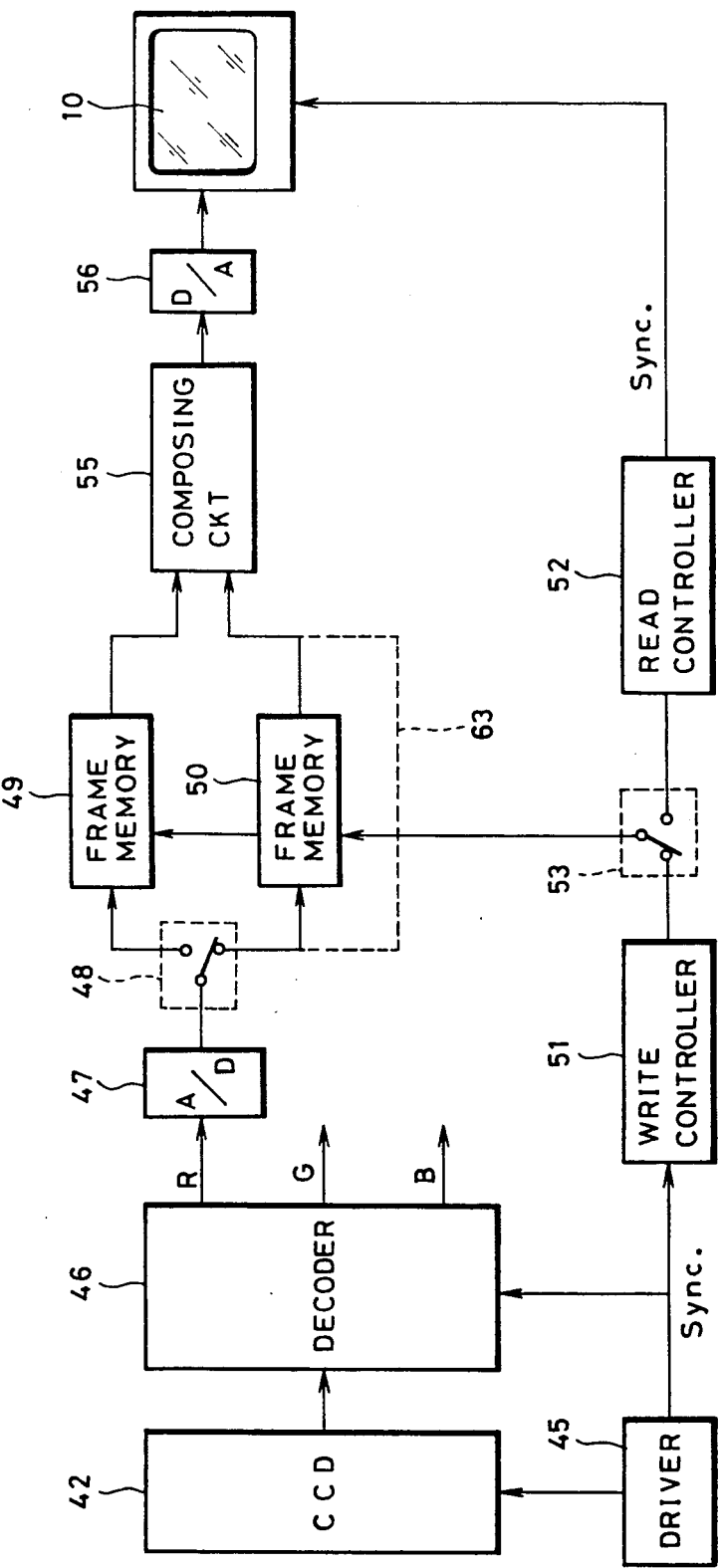
FIG. 3 is a block diagram illustrating a monitor circuit used in the printer-processor shown in FIG. 1.

The monitor circuit in cooperation with the monitor optical system 39 is shown in FIG. 3, including a driver 45 for driving the CCD image sensor 42 to provide video signals which in turn are sent to a decoder 46 for three color separation in a manner well known in the color TV art. The three color signals, R, G and B for red, green and blue are, respectively, sent to three signal processing circuits. Because the three signal processing circuits are identical in structure and operation, details of the signal processing circuit for red is shown and described hereafter.

The signal processing circuit for red signals R includes an A/D converter 47 for transforming the red signals R into a digital form. A selector 48 is operated in cooperation with the sliding movement of the holder assembly to select one of two frame memories; a frame memory 49 for a principal image and frame memory 50 for a letter image so as to store the red signals R in the selected memory 49 or 50. Each frame memory 49 or 50 is addressed by a write controller 51 to write or store the red signals R therein and by a read controller 52 to read out the red signal R therefrom. An image composing circuit 55 receives red signals R read out from the frame memories 49 and 50, respectively, to provide red composite image signals of a principal or picture image and a letter image. A D/A converter 56 transforms the red signals into an analog form and sends them to the color CRT 10 as a color monitor. The color CRT 10 displays the red, green and blue composite image signals as a color image structured from three color principal images and three color letter images.

The monitor circuit further includes a selector 53 for connecting both of the frame memories 49 and 50 to either one of the write controller 51 and read controller 52 so as to address the frame memories 49 and 50 for writing or reading the red signals R. The write controller 51 is supplied with synchronizing signals by the driver 45 to generate address signals for writing in the frame memories 49 and 50. Similarly, the read controller 52 generates address signals for reading from the frame memories 49 and 50 and synchronizing signals for driving the color CRT 10.

For providing images that are composite, the film masking frame 28 is made of a light opaque sheet and is formed with an opening 28a which exposes a major part of picture image 9a of a frame of the negative film 9, but covers lower part 9b of the frame of the negative film 9 where letters are desired to be inlaid. The film masking frame 28 is put on or under the frame of the negative film 9 between the film holder 22 and the holder base 21. When the holder assembly 7, which holds the negative film 9 having a frame masked with the film masking frame 28, is inserted into the printing stage E of the printer 6, the principal image 9a exposed by the opening 28a of the film masking frame 28 is displayed on the screen of the color CRT 10 and three color video signals of the principal image 9a are stored by color in one of each of the frame memories.

The complimentary bearing sheet masking frame 30 is made of a light opaque sheet and is formed with an opening 30a having the same dimensions as the lower part 9b of the negative film 9 where the film masking frame 28 covers. The complimentary bearing sheet masking frame 30 is put on or under the complimentary bearing sheet 29 with letters 29a forming a complimentary phrase in a lower part thereof between the complimentary bearing sheet holder 23 and the holder base 21. When the holder assembly 7, which holds the complimentary bearing sheet 29 having the letters 29a exposed with the letter masking frame 30, is inserted into the printing stage E of the printer 6, the principal image 9a exposed by the opening 28a of the film masking frame 28 is displayed on the screen of the color CRT and three color video signals of the letters 29a are stored by color in the other of each of the two frame memories. The video signals of the principal image and the letter image are read out from the respective frame memories and composed as composite video signals by color.

The operation of the photographic printer in accordance with the above preferred embodiment of the present invention will be described hereinafter.

Before printing, the holder assembly 7 is removed from the printer 6, and the negative film 9 is placed on the see-through table 2 for visual observation or inspection to determine the emulsion applied surface or image surface and the upside thereof. Following the preliminary inspection, the negative film 9 overlapped with the film masking frame 28 is inserted in the holder assembly 7 upside down with the image surface directed back and held with the film holder 22. Similarly, the complimentary bearing sheet 29 overlapped with the complimentary bearing sheet masking frame 30 is inserted in the holder assembly 7 and held with the complimentary bearing sheet holder 23. Then, the holder assembly 7 is inserted into the printing stage E of the printer 6. The printing lens setup 33 is turned to align the opening 36 of the mount disk 33a with the printing light path 26.

Printing light from the lamp 24 passing through the part of the principal image 9a uncovered with the film masking frame 28 passes the opening of the mount 33a of the printing lens setup 33 and is reflected by the slidable mirror 34 in the printing light path 26 and directed to the monitor optical system 39. The zoom lens 40 focuses an image of the uncovered part of the image 9a on the surfaces of the CCD image sensor 42 and the light metering device 43 through the beam splitter 41.

The CCD image sensor 42 converts the image of the uncovered part of the frame into video signals. The video signals are separated by color, namely, red, green and blue, by the decoder 46. The respective color video signals are transformed into corresponding color image data by the A/D converters 47 and then stored in the corresponding frame memories 49 selected by the selector 48 at addresses designated by the write controller 51.

Thereafter, the holder assembly 7 is slid to align the complimentary bearing sheet holder 23 with the opening 36 of the mount disk 33a now in the printing path 26. At this time, in cooperation with the sliding movement of the holder assembly 7, the selectors 48 select the frame memories 50 for the respective colors. In the same manner as for the principal image 9a, an image of the complimentary bearing sheet 29 is picked up by the monitor optical system 39 to store three color image data in the corresponding frame memories 50. After storing the color image data for principal image and letter image, the selector 53 switches to the read controller 52 to address the frame memories 49 and 50 so as to read out the image data for red. The red image data thus read out are composed in the single composing circuit 55 for composing the principal image and letter image for red. The red composite image data are transformed into an analog form by the D/A converter 56 to provide red image video signals. In the same manner, green and blue video signals are provided.

The three color video signals are displayed as a composite color image structured from the principal image 9a and a complimentary phrase 29a on the screen of the color CRT 10 for laying out, as is illustrated in FIG. 4. If another complimentary phrase is desired, the complimentary bearing sheet 29 is replaced with another one with a desired complimentary phrase. Furthermore, if the complimentary phrase 29a on the screen is undesirably laid out, then the position of the complimentary bearing sheet 29 is readjusted in the holder assembly 7. If the composite image on the screen is undesirable in color balance and/or color density, the keys of the keyboard 2 are operated to display a desirably simulated color composite image for a proper exposure.

After the visual inspection, the holder assembly 7 is slid to align the negative film 9 in the film holder 22 with the printing light path 26. When operating a print key of the keyboard 1 after the operation of a principal image printing key of the keyboard 1, the mount disk 33a of the printing lens setup 33 is turned to locate a desired one of the printing lenses 37 and 38, for example the printing lens 37, in the printing light path 26. Likewise, the slidable mirror 34 is slid in a direction shown by an arrow in FIG. 2 to the displaced from the printing light path 26. Immediately after the displacement of the slidable mirror 34 the shutter 35 is opened for a proper time, so as to expose the photographic paper 15 to the image of the complimentary phrase projected by the printing lens 37.

Thereafter the holder assembly 7 is slid to align the complimentary phrase bearing sheet 29 in the sheet holder 23 with the printing light path 26. When operating the print key of the keyboard 1 after the operation of a complimentary image printing key of the keyboard 1 the mount disk 33a of the printing lens setup 33 is turned to locate the other of the printing lenses 37 and 38, namely the printing lens 38, in the printing light path 26 while the slidable mirror 34 is maintained displaced from the printing light path 26. Immediately after the alignment of the printing lens 38, the shutter 35 is opened again for a proper time, so as to expose the photographic paper 15 to the image of the complimentary phrase 29a projected by the printing lens 37. As a result, a composite image constructed from a principal image 60 and a complimentary phrase image 61 is formed on the photographic paper 15 in a multiple exposure manner. After this multiple exposure, the photographic paper 15 is withdrawn by a length equal to one frame for another multiple exposure. The exposed photographic paper 15 is developed in the photographic processor 11 and a print of a principal image 60 with a complimentary phrase 61 inlaid is provided as shown in FIG. 4.

If it is not required to inlay such a complimentary phrase in a print, it is not necessary to overlap the negative film 9 with the film masking frame 28 in the film holder 22.

Although the monitor circuit shown in FIG. 3 is described as having two frame monitors 49 and 50 for each color, it is permissible to use only the frame memory 49 for each color. In this case, as shown by a chained line in FIG. 3, the selector 48 and the signal composing circuit 55 are interconnected. After storing image data of a principal image in the frame memory 49, image data of a complimentary phrase are directly transferred to the signal composing circuit 55 and added to the image data read out from the frame memory 49.

It will be understood that various changes and modifications may be made in the form, details and arrangement of the parts without departing from the scope of the invention set forth in the accompanying claims.

What is claimed is:

1. A photographic printer with a monitor comprising:
    a printing optical system including a light source and a printing lens between which a printing stage is defined in a printing optical path;
    a unitary holder for separately holding both a film and a phrase bearing sheet bearing a phrase, said unitary holder being slidable in said printing stage to selectively place said film or said sheet in said printing optical path;
    image pickup means for providing an image of said film or said phrase bearing sheet, which is placed in said printing optical path;

composing means for combining said images of said film and said phrase bearing sheet and providing composed image data; and display means for displaying said composed image data as a composite image.

2. A photographic printer as defined in claim 1, wherein said composing means comprises a memory for storing image data of said image of either one of said film and said phrase bearing sheet, and a composing circuit for electrically composing said image data read out from said memory and image data of said image of the other of said film and said phrase bearing sheet which is positioned in said printing optical path.

3. A photographic printer as defined in claim 2, wherein said composing means is provided for each primary color.

4. A photographic printer as defined in claim 1, wherein said composing means comprises a pair of memories for separately storing image data of said images of said film and said phrase bearing sheet, and a composing circuit for electrically composing said image data read out from said pair of memories.

5. A photographic printer as defined in claim 4, wherein said composing means is provided for each primary color.

6. A photographic printer as defined in claim 1, further comprising a film masking frame for overlapping said film to cover a part of said film where said complimentary phrase is inlaid on a print and a complimentary phrase bearing sheet masking frame for overlapping said complimentary phrase bearing sheet so as to uncover said complimentary phrase of said complimentary phrase bearing sheet.

7. A photographic printer as defined in claim 1, further comprising a printing lens assembly having at least one printing lens and a mirror movable into and displaceable from said printing optical path, said printing lens being displaced in said printing optical path in cooperation with said displacement of said mirror from said printing optical path.

8. A photographic printer as defined in claim 7, wherein said printing lens assembly comprises a rotatable lens mount carrying said at least one printing lens and formed with an opening, said rotatable lens mount being rotated in cooperation with said displacement of said mirror from said printing optical path so as to place said printing lens in said printing optical path or with said movement of said mirror into said printing optical path so as to place said opening in said printing optical path.

* * * * *